United States Patent
Kilchyk et al.

(10) Patent No.: US 12,546,224 B2
(45) Date of Patent: Feb. 10, 2026

(54) AIRCRAFT AIRFOIL FORMED FROM THERMALLY ADAPTIVE MATERIALS AND INCLUDING DAMPING ELEMENT, STIFFENING ELEMENT, AND A THERMOELECTRIC JUNCTION

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/533,952

(22) Filed: Dec. 8, 2023

(65) Prior Publication Data
US 2025/0084766 A1    Mar. 13, 2025

Related U.S. Application Data (63) Continuation-in-part of application No. 18/464,160, filed on Sep. 8, 2023, and a continuation-in-part of
(Continued)

(51) Int. Cl.
*F01D 5/28*    (2006.01)
*B64C 3/52*    (2006.01)
(Continued)

(52) U.S. Cl.
CPC ............... *F01D 5/28* (2013.01); *B64C 3/52* (2013.01); *F01D 5/12* (2013.01); *H10N 10/17* (2023.02)

(58) Field of Classification Search
CPC ... B64C 11/16–11/28; B64C 3/00–3/58; F03D 1/0675–1/069; F01D 5/12–5/288; H10N 10/17
See application file for complete search history.

(56) References Cited

U.S. PATENT DOCUMENTS 3,326,726 A    6/1967    Bassett, Jr. et al.
4,327,154 A *  4/1982    Rossmann ............ F01D 25/005
                                                          419/33
(Continued)

FOREIGN PATENT DOCUMENTS

DE         10250758 A1     5/2004
DE     102014225229 A1     6/2016
(Continued)

OTHER PUBLICATIONS

Kim, Daejong, "Parametric Studies on Static and Dynamic Performance of Air Foil Bearings with Different Top Foil Geometries and Bump Stiffness Distributions", https://doi.org/10.1115/1.2540065; Published Online: Nov. 15, 2006, 9 pages.
(Continued)

*Primary Examiner* — Sang K Kim
(74) *Attorney, Agent, or Firm* — CANTOR COLBURN LLP (57) ABSTRACT

An airfoil, having: a body defining a leading edge and a trailing edge, wherein the body comprises: a base having an outer boundary extending longitudinally from a first end to a second end and transversely from a first side to a second side; and beads within the outer boundary, wherein each of the beads has a bead void, and wherein one or more of the beads includes: damping element within the bead void; or stiffening element extending across the bead.

20 Claims, 10 Drawing Sheets

Related U.S. Application Data application No. 18/464,159, filed on Sep. 8, 2023, and a continuation-in-part of application No. 18/464,165, filed on Sep. 8, 2023, now abandoned, and a continuation-in-part of application No. 18/464,142, filed on Sep. 8, 2023, and a continuation-in-part of application No. 18/464,164, filed on Sep. 8, 2023, and a continuation-in-part of application No. 18/464,153, filed on Sep. 8, 2023, and a continuation-in-part of application No. 18/464,147, filed on Sep. 8, 2023, and a continuation-in-part of application No. 18/464,163, filed on Sep. 8, 2023, and a continuation-in-part of application No. 18/464,139, filed on Sep. 8, 2023, and a continuation-in-part of application No. 18/464,157, filed on Sep. 8, 2023.

(51) Int. Cl.
*F01D 5/12* (2006.01)
*H10N 10/17* (2023.01)

(56) References Cited

U.S. PATENT DOCUMENTS

| | | | |
|---|---|---|---|
| 4,851,285 | A | 7/1989 | Brotz |
| 4,939,038 | A | 7/1990 | Inabata |
| 5,230,850 | A * | 7/1993 | Lewis ............... B29D 99/0025 264/112 |
| 5,634,189 | A | 5/1997 | Rossmann et al. |
| 6,100,463 | A | 8/2000 | Ladd et al. |
| 6,161,382 | A | 12/2000 | Brotz |
| 6,182,929 | B1 | 2/2001 | Martin et al. |
| 7,037,076 | B2 | 5/2006 | Jacot et al. |
| 7,147,269 | B2 | 12/2006 | Aase et al. |
| 7,650,910 | B2 | 1/2010 | Welle |
| 7,686,040 | B2 | 3/2010 | Welle |
| 7,721,762 | B2 | 5/2010 | Welle |
| 7,753,654 | B2 * | 7/2010 | Read ...................... F02C 7/045 416/500 |
| 7,770,959 | B2 | 8/2010 | Browne et al. |
| 7,854,467 | B2 | 12/2010 | Mcknight et al. |
| 7,922,456 | B2 | 4/2011 | McMillan |
| 7,967,568 | B2 * | 6/2011 | Dalton .................... F01D 9/041 415/115 |
| 8,119,206 | B2 * | 2/2012 | Hougham .......... H01R 13/2414 427/217 |
| 9,181,933 | B2 | 11/2015 | Daly et al. |
| 9,719,536 | B2 | 8/2017 | Ashmawi et al. |
| 9,752,442 | B2 | 9/2017 | Hayford et al. |
| 9,784,126 | B2 | 10/2017 | Army et al. |
| 9,897,078 | B2 | 2/2018 | Nicholson et al. |
| 9,919,470 | B2 | 3/2018 | Behl et al. |
| 9,981,421 | B2 | 5/2018 | Marcoe et al. |
| 10,053,239 | B2 | 8/2018 | Mabe et al. |
| 10,543,897 | B2 | 1/2020 | Brown et al. |
| 10,731,666 | B2 | 8/2020 | Skertic |
| 10,815,976 | B2 | 10/2020 | Kaneko et al. |
| 10,976,119 | B2 | 4/2021 | Veto et al. |
| 10,982,783 | B2 | 4/2021 | Srinivasa Murthy |
| 11,008,943 | B2 | 5/2021 | Tajiri et al. |
| 11,110,647 | B2 | 9/2021 | Marcoe et al. |
| 11,167,836 | B2 * | 11/2021 | Hethcock, Jr. ............ B64C 3/26 |
| 11,192,333 | B2 | 12/2021 | Hahnlen |
| 11,248,592 | B1 | 2/2022 | Tsuruta et al. |
| 11,268,520 | B2 | 3/2022 | Melo et al. |
| 11,359,287 | B2 | 6/2022 | Philibert |
| 11,655,346 | B2 | 5/2023 | Jackson et al. |
| 11,668,316 | B1 | 6/2023 | Kilchyk et al. |
| 12,162,606 | B1 | 12/2024 | Merritt et al. |
| 2001/0008357 | A1 | 7/2001 | Dhuler et al. |
| 2007/0140862 | A1 * | 6/2007 | McMillan ............... F01D 25/24 416/232 |
| 2007/0171257 | A1 | 7/2007 | Yang |
| 2007/0184238 | A1 | 8/2007 | Hockaday et al. |
| 2008/0236668 | A1 | 10/2008 | Beerling et al. |
| 2008/0302024 | A1 | 12/2008 | Browne et al. |
| 2010/0028205 | A1 | 2/2010 | Ponjee et al. |
| 2010/0304063 | A1 | 12/2010 | McCrea et al. |
| 2011/0284645 | A1 | 11/2011 | Tiliakos et al. |
| 2012/0255278 | A1 | 10/2012 | Miao et al. |
| 2013/0048135 | A1 | 2/2013 | Blumenthal et al. |
| 2013/0255796 | A1 | 10/2013 | Dimascio et al. |
| 2013/0255815 | A1 | 10/2013 | Brinkmann et al. |
| 2013/0287555 | A1 | 10/2013 | Rosen et al. |
| 2014/0186161 | A1 | 7/2014 | Colson et al. |
| 2015/0033730 | A1 | 2/2015 | Beers et al. |
| 2015/0239046 | A1 | 8/2015 | McMahan et al. |
| 2016/0025078 | A1 | 1/2016 | Li et al. |
| 2016/0160353 | A1 | 6/2016 | Miarecki et al. |
| 2016/0186575 | A1 | 6/2016 | Lacy et al. |
| 2017/0001263 | A1 | 1/2017 | Steiner |
| 2017/0227019 | A1 | 8/2017 | Chen et al. |
| 2018/0038513 | A1 | 2/2018 | Baldea et al. |
| 2018/0043660 | A1 | 2/2018 | Kang et al. |
| 2018/0058429 | A1 | 3/2018 | Kwon et al. |
| 2019/0203039 | A1 | 7/2019 | Seo et al. |
| 2019/0210111 | A1 | 7/2019 | Army et al. |
| 2020/0009826 | A1 | 1/2020 | Brown et al. |
| 2020/0316684 | A1 | 10/2020 | Shuck |
| 2021/0020263 | A1 | 1/2021 | Pasini et al. |
| 2021/0071020 | A1 | 3/2021 | Hu |
| 2021/0085856 | A1 | 3/2021 | Ding |
| 2021/0229350 | A1 | 7/2021 | Chaffins et al. |
| 2021/0238748 | A1 | 8/2021 | Andreatta |
| 2021/0277937 | A1 | 9/2021 | Elbibary et al. |
| 2021/0372286 | A1 | 12/2021 | Chakrabarti et al. |
| 2022/0034592 | A1 | 2/2022 | Maynard et al. |
| 2022/0089799 | A1 | 3/2022 | Wang et al. |
| 2023/0080512 | A1 | 3/2023 | Merritt et al. |
| 2023/0085189 | A1 | 3/2023 | Merritt et al. |
| 2023/0142146 | A1 | 5/2023 | Kilchyk |
| 2023/0227680 | A1 | 7/2023 | Hu |
| 2025/0033270 | A1 | 1/2025 | Merritt et al. |
| 2025/0033271 | A1 | 1/2025 | Merritt et al. |
| 2025/0033272 | A1 | 1/2025 | Merritt et al. |
| 2025/0033282 | A1 | 1/2025 | Merritt et al. |
| 2025/0033283 | A1 | 1/2025 | Merritt et al. |
| 2025/0033796 | A1 | 1/2025 | Merritt et al. |
| 2025/0083795 | A1 | 3/2025 | Kilchyk et al. |
| 2025/0084833 | A1 | 3/2025 | Kilchyk et al. |
| 2025/0084834 | A1 | 3/2025 | Kilchyk et al. |
| 2025/0084859 | A1 | 3/2025 | Kilchyk et al. |
| 2025/0085725 | A1 | 3/2025 | Kilchyk et al. |
| 2025/0088125 | A1 | 3/2025 | Kilchyk et al. |
| 2025/0089567 | A1 | 3/2025 | Kilchyk et al. |
| 2025/0089568 | A1 | 3/2025 | Kilchyk et al. |

FOREIGN PATENT DOCUMENTS

| | | |
|---|---|---|
| EP | 2025777 A2 | 2/2009 |
| EP | 2974954 A1 | 1/2016 |
| EP | 2960497 B1 | 12/2016 |
| EP | 4177440 A1 | 5/2023 |
| EP | 4209681 A1 | 7/2023 |
| EP | 4219959 A2 | 8/2023 |
| EP | 4411108 A2 | 8/2024 |
| GB | 2472053 A | 1/2011 |
| JP | 2007023361 A | 2/2007 |
| JP | 2011148037 A | 8/2011 |
| KR | 20130005989 A | 1/2013 |
| WO | 2015006438 A1 | 1/2015 |
| WO | 2018108908 A1 | 6/2018 |
| WO | 2019108203 A1 | 6/2019 |
| WO | 2019162754 A1 | 8/2019 |

OTHER PUBLICATIONS

Lim, Teik-Cheng "Metamaterial with sign-toggling thermal expansivity inspired by Islamic motifs in Spain", Journal of Science: Advanced Materials and Devices, vol. 7, No. 1, Mar. 2022, 6 pages.
Markforged "Onyx FR-A and Carbon Fiber FR-A: Aerospace-Ready Materials", markforged.com, Jul. 26, 2021, pp. 1-6.

(56) References Cited

OTHER PUBLICATIONS

Micalizzi, Simone et al., Shape-memory actuators manufactured by dual extrusion multimaterial 3d printing of conductive and non-conductive filaments; 2019 Smart Mater. Struct. 28 105025; 13 pages.
Noughabi et al., "Detailed Design and Aerodynamic Performance Analysis of a Radial-Inflow Turbine", Applied Sciences, 2018, pp. 1-21.
Pearson et al., "Novel polyurethane elastomeric composites reinforced with alumina, aramid, and poly (p-phenylene-2, 6-benzobisoxazole) short fibers, development and characterization of the thermal and dynamic mechanical properties", Composites Part B: Engineering 122 (2017): 192-201.
Schmiedeke, et al. "Experimental Investigation of Two Switching States of an Active Foil Bearing during Start-Up", Machines 2022, Published Jun. 6, 2022, 18 pages.
Wei, et al., "An overview of laser-based multiple metallic material additive manufacturing: from macro-to micro-scales", International Journal of Extrem. Manuf. 3 (2021), pp. 1-33.
Zhan et al., "Metal-plastic hybrid 3D printing using catalyst-loaded filament and electroless plating", Additive Manufacturing, 2020, pp. 1-7.
Zhiguo et al., "Determination of thermal expansion coefficients for unidirectional fiber-reinforced composites", Chinese Journal of Aeronautics, 2014, pp. 1-14.
European Search Report for Application No. 24196227.3, maield Oct. 31, 2024, 10 pages.
European Search Report for Application No. 24196233.1, mailed Oct. 31, 2024, 10 pages.
European Search Report for Application No. 24198989.6, mailed Nov. 4, 2024, 11 pages.
Doering et al., "Micromachined thermoelectrically driven cantilever structures for fluid jet deflection" [1992] Proceedings IEEE Micro Electro Mechanical Systems. IEEE, (Feb. 1992) pp. 12-18.
European Search Report for Application No. 24188681.1, mailed Dec. 4, 2024, 10 pages.
European Search Report for Application No. 24188696.9, mailed Dec. 16, 2024, 8 pages.
European Search Report for Application No. 24188713.2, mailed Jan. 2, 2025, 6 pages.
European Search Report for Application No. 24188714.0, mailed Dec. 13, 2024, 10 pages.
European Search Report for Application No. 24190738.5, mailed Jan. 13, 2025, 8 pages.
European Search Report for Application No. 24196219.0, mailed Jan. 13, 2025, 8 pages.
European Search Report for Application No. 24196295.0, mailed Jan. 29, 2025, 16 pages.
European Search Report for Application No. 24196309.9, mailed Jan. 28, 2025, 10 pages.
European Search Report for Application No. 24199023.3, mailed Feb. 21, 2025, 15 pages.
European Search Report for Application No. 24199038.1, mailed Jan. 31, 2025, 8 pages.
European Search Report for Application No. 24199041.5, mailed Jan 28, 2025, 8 pages.
Jerman "Electrically-activated, micromachined diaphragm valves" IEEE 4th Technical Digest on Solid-State Sensor and Actuator Workshop, Hilton Head, SC, USA, (Jun. 1990) pp. 65-69.
Jerman et al., "Electrically activated normally closed diaphragm valves" Journal of Micromechanics and Microengineering 4.4 (Dec. 1994) pp. 210-216.
Partial European Search Report for Application No. 24196240.6, mailed Feb. 7, 2025, 16 pages.
Richardson,, "The aerospace secret standard", Apr. 12, 2019, Aerospace Manufacturing, www.aero-mag.com/the-aerospace-secret-standard; 8 pages.
European Search Report for Application No. 24182403.6, dated Jun. 2, 2025, pp. 1-11.
European Search Report for EP Application No. 24196240.6, dated Apr. 28, 2025, pp. 1-13.
Lazarus et al., "Direct electroless plating of conductive thermoplastics for selective metallization of 3D printed parts", Additive Manufacturing, vol. 55, Mar. 30, 2022, pp. 1-11.
Giani et al., "Towards sustainability in 3D printing of thermoplastic composites: Evaluation of recycled carbon fibers as reinforcing agent for FDM filament production and 3D printing", Composites: Part A 159, 2002, pp. 1-12.
Tammaro et al., "Reinforcing Efficiency of Recycled Carbon Fiber PLA Filament Suitable for Additive Manufacturing", Polymers 2024, pp. 1-17.

\* cited by examiner

AIRCRAFT AIRFOIL FORMED FROM THERMALLY ADAPTIVE MATERIALS AND INCLUDING DAMPING ELEMENT, STIFFENING ELEMENT, AND A THERMOELECTRIC JUNCTION

CROSS-REFERENCE TO RELATED APPLICATIONS

This application is a continuation-in-part of U.S. application Ser. No. 18/464,165 filed Sep. 8, 2023, U.S. application Ser. No. 18/464,139 filed Sep. 8, 2023, U.S. application Ser. No. 18/464,142 filed Sep. 8, 2023, U.S. application Ser. No. 18/464,147 filed Sep. 8, 2023, U.S. application Ser. No. 18/464,153 filed Sep. 8, 2023, U.S. application Ser. No. 18/464,157 filed Sep. 8, 2023, U.S. application Ser. No. 18/464,159 filed Sep. 8, 2023, U.S. application Ser. No. 18/464,160 filed Sep. 8, 2023, U.S. application Ser. No. 18/464,163 filed Sep. 8, 2023 and U.S. application Ser. No. 18/464,164 filed Sep. 8, 2023, the disclosures of each of which are incorporated herein by reference in their entirety.

BACKGROUND

The embodiments are directed to an airfoil of an aircraft and more specifically to an airfoil, of an aircraft, that is formed from thermally adaptive materials and including damping element, stiffening element, and a thermoelectric junction.

Memory shape alloys may be utilized for various applications to avoid the requirement of utilizing complex machinery. However, working fluid temperatures may undesirably control the shape of the alloy.

BRIEF DESCRIPTION

Disclosed is an airfoil, including a body defining a leading edge and a trailing edge, wherein the body comprises: a base having an outer boundary extending longitudinally from a first end to a second end and transversely from a first side to a second side; and beads within the outer boundary, wherein each of the beads has a bead void, and wherein one or more of the beads includes: damping element within the bead void; or stiffening element extending across the bead.

In addition to one or more aspects of the airfoil, or as an alternate, one or more of the beads includes: the damping element within the bead void; and the stiffening element extending across the bead.

In addition to one or more aspects of the airfoil, or as an alternate, the damping element is a thermoplastic.

In addition to one or more aspects of the airfoil, or as an alternate, the stiffening element is a reinforcement fiber.

In addition to one or more aspects of the airfoil, or as an alternate, the stiffening element one of: a metal fiber; a carbon fiber; and a fiberglass fiber.

In addition to one or more aspects of the airfoil, or as an alternate, each of the beads is nonmetal.

In addition to one or more aspects of the airfoil, or as an alternate, each of the beads defines: first and second perimeter segments that are opposite each other and have a first CTE; and third and fourth perimeter segments that are opposite each other and adjacent to the first and second perimeter segments and have a second CTE that differs from the first CTE, to define a bead CTE gradient.

In addition to one or more aspects of the airfoil, or as an alternate, a thermoelectric junction is disposed around the outer boundary or in one or more of the bead voids.

In addition to one or more aspects of the airfoil, or as an alternate, one or more of the beads includes two or more of: the thermoelectric junction; the damping element within the bead void; or the stiffening element extending across the bead.

In addition to one or more aspects of the airfoil, or as an alternate, one or more of the beads includes each of: the thermoelectric junction; the damping element within the bead void; and the stiffening element extending across the bead.

In addition to one or more aspects of the airfoil, or as an alternate, each of the beads defines: an outer surface; and an inner surface, wherein the inner surface defines the bead void, wherein: the outer surface of the first and second perimeter segments has the first CTE, and the inner surface of the first and second perimeter segments has the second CTE; and the outer surface of the third and fourth perimeter segments has the second CTE, and the inner surface of the third and fourth perimeter segments has the first CTE.

In addition to one or more aspects of the airfoil, or as an alternate, the outer boundary defines a first outer end and a second outer end, wherein the first and second outer ends are opposite each other, and the base includes a top elastomer layer that is disposed against the first outer end of the outer boundary and a bottom elastomer layer that is disposed against the second outer end of the outer boundary.

In addition to one or more aspects of the airfoil, or as an alternate, the base includes an elastomer segment that extends from each of the beads that are located along the outer boundary of the base, so that adjacent ones of the elastomer segments overlap each other to define a flexible outer boundary cover.

In addition to one or more aspects of the airfoil, or as an alternate, the base is formed as a block having base voids, wherein each of the base voids is lined with one of the beads.

In addition to one or more aspects of the airfoil, or as an alternate, the block is nonmetal.

In addition to one or more aspects of the airfoil, or as an alternate, each of the beads is oval shaped or diamond shaped.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
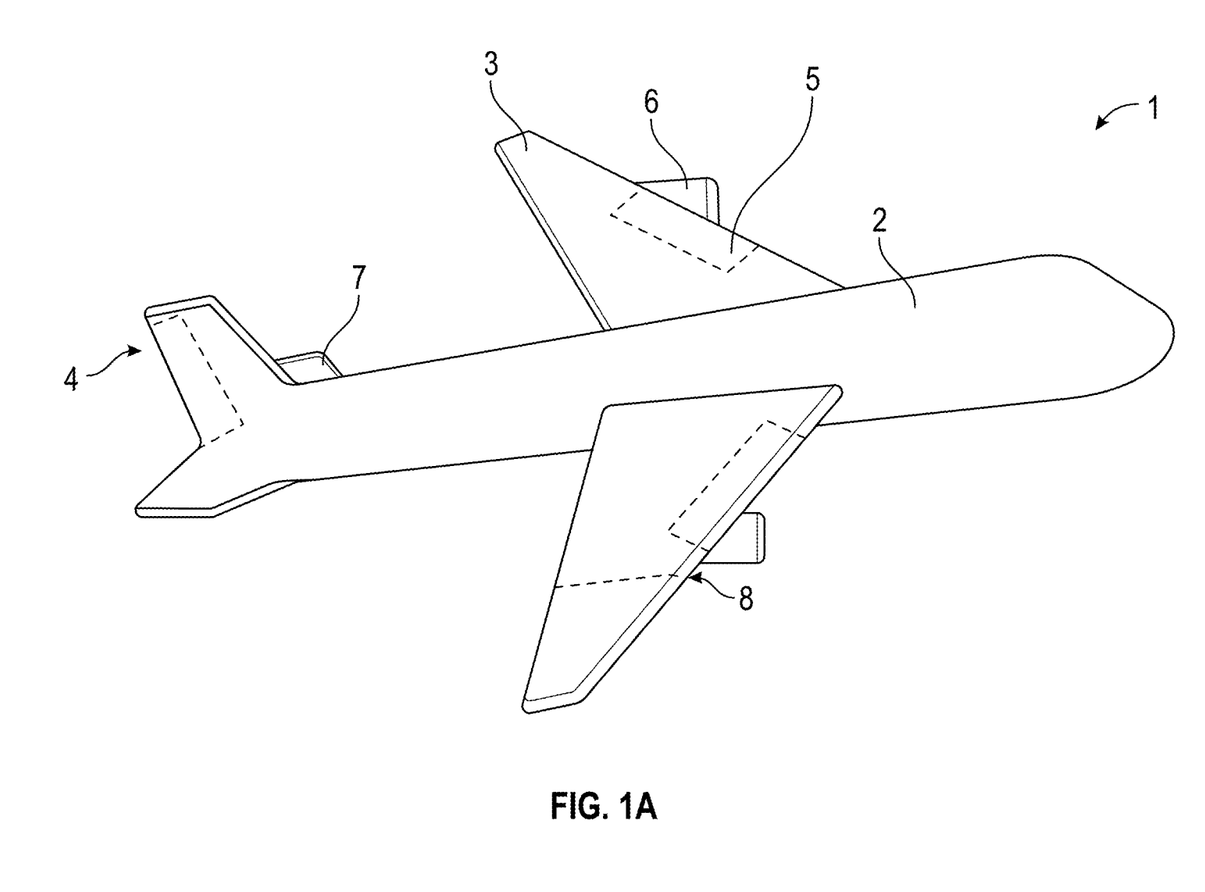
FIG. 1A shows an aircraft according to an embodiment.

FIG. 1A shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4.

Figure 1B:
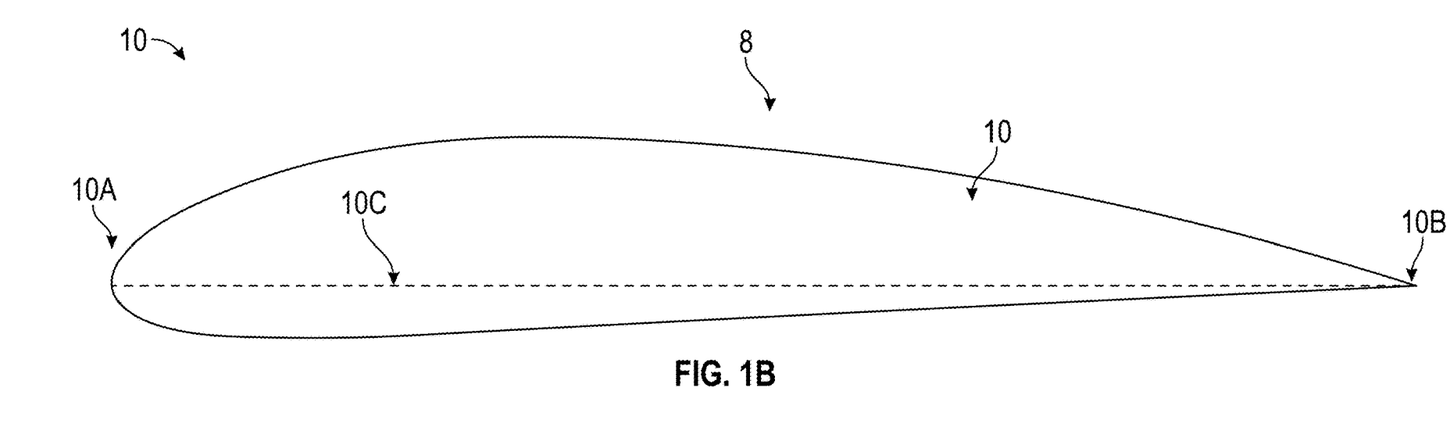
FIG. 1B shows a component of the aircraft according to an embodiment, where the component is an airfoil with a first camber profile.
Figure 1C:
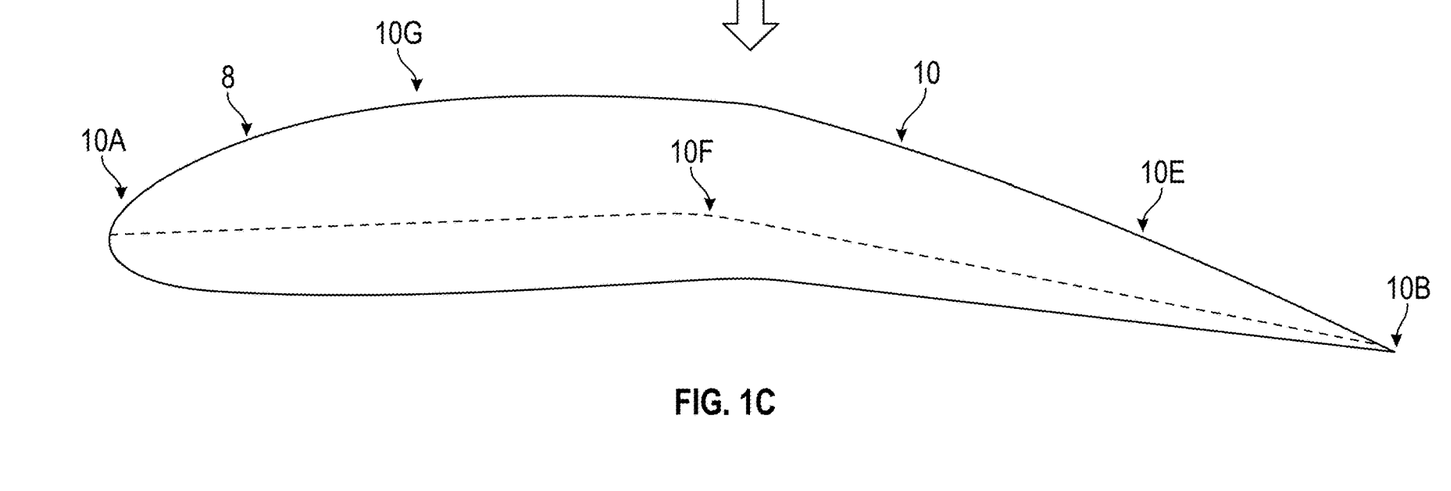
FIG. 1C shows the same airfoil of FIG. 1B with a second camber profile.

Turning to FIGS. 1B and 1C, an airfoil 8 is disclosed. The airfoil 8 includes a body 10 defining a leading edge 10A and a trailing edge 10B and a cord 10C. A trailing section 10E extends from the trailing edge 10B to an intermediate point 10F, intermediate the leading and trialing edges 10A, 10B. The point 10F may be center cord, quarter cord (from the front), or another location. A leading section 10G extends from the leading edge 10A to the intermediate point 10F. The materials utilized for the airfoil 8 enable predetermined elastic deformation and therefore movement of the trailing section 10E relative to the leading section 10G, e.g., to desirably change camber and therefore lift characteristics for takeoff, during flight and landing. In one embodiment, the airfoil 8 is additively manufactured.

Figure 2:
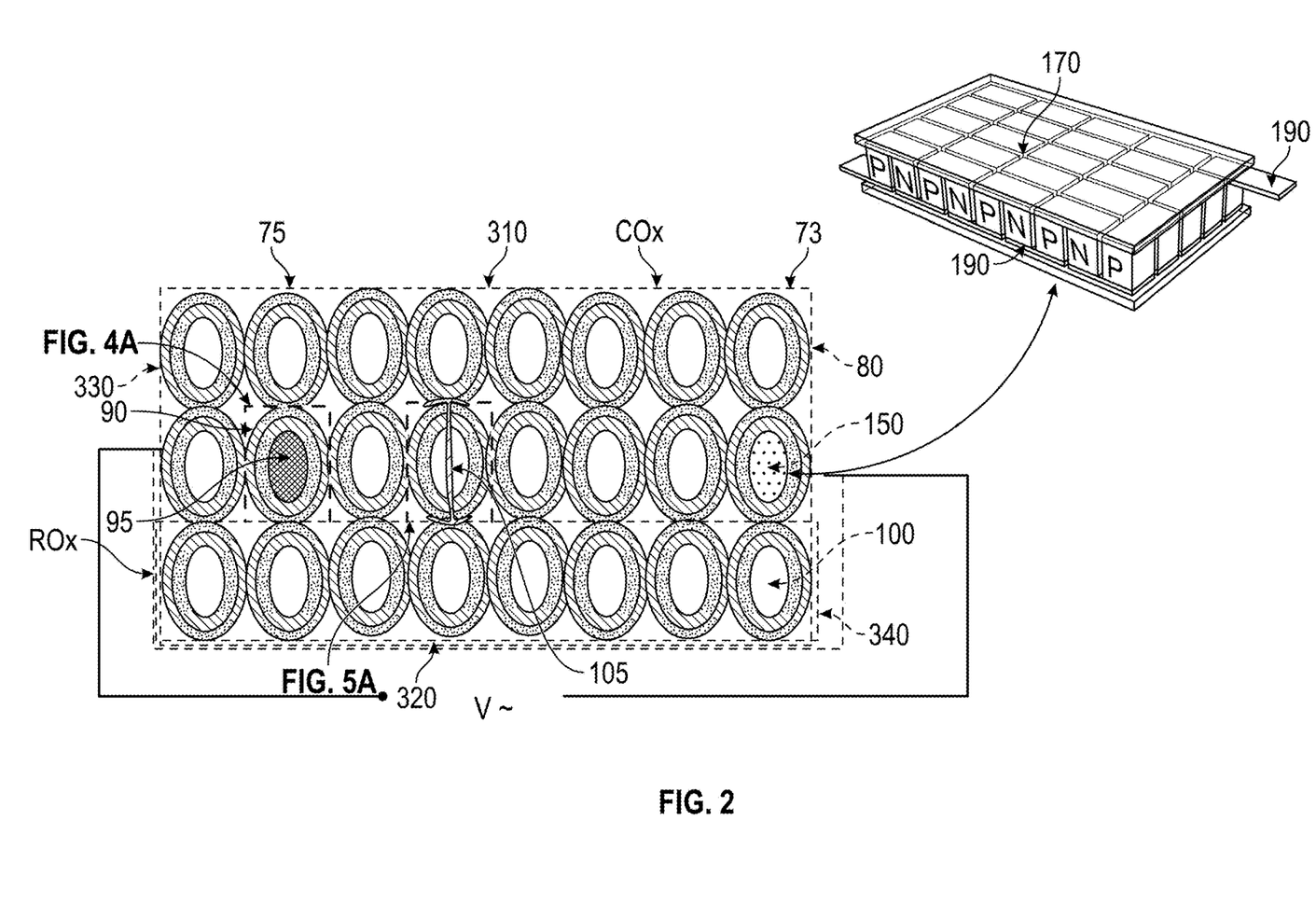
FIG. 2 shows a material configuration of the component, having a base formed of a lattice of beads having coefficient of thermal expansion (CTE) gradients selected to provide a predetermined deformation, and where the lattice is formed with one or more of a damping element, a stiffening element and a thermoelectric junction.

Turning to FIG. 2, the body 10 has a base 70 (or body segment) having an outer boundary 80 extending longitudinally from a first end 310 to a second end 320 and transversely from a first side 330 to a second side 340. Beads 90 are within the outer boundary 80. In FIG. 2, the beads 90 are arranged as a lattice 73 of three rows R0x and nine columns C0x, but this is not intended on limiting the arrangement of the beads 90. The beads 90 may be metal such as a bistable material, or nonmetal, such as thermoplastic. Each of the beads 90 has a bead void 100 so that each bead 90 formed a closed loop.

According to the embodiments, one or more of the beads 90 includes a damping element (i.e., damping material) 95 within the bead void 100. The damping element 95 may be a thermoplastic. In addition, or alternatively, the one or more of the beads 90 includes a stiffening element (or a stiffening material) 105 extending across the bead 90, e.g., over the void 100. The stiffening element 105 may be a reinforcement fiber. The fiber may be a metal fiber, a carbon fiber, or a fiberglass fiber, as nonlimiting examples.

Figure 3A:
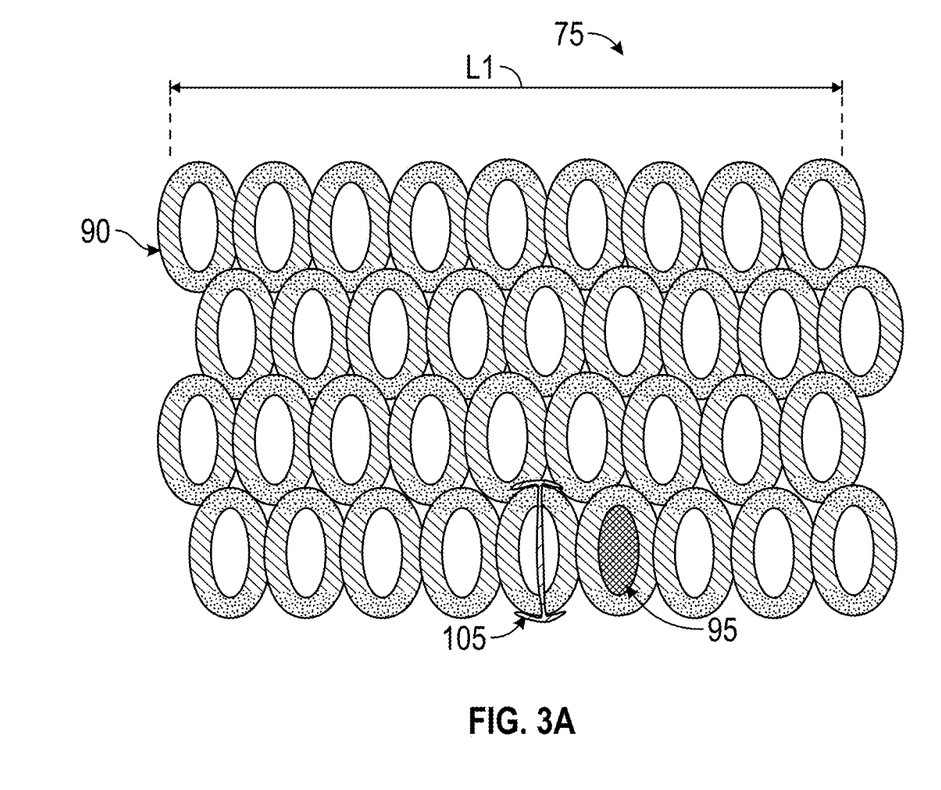
FIG. 3A shows the lattice of beads in a normal state.
Figure 3B:
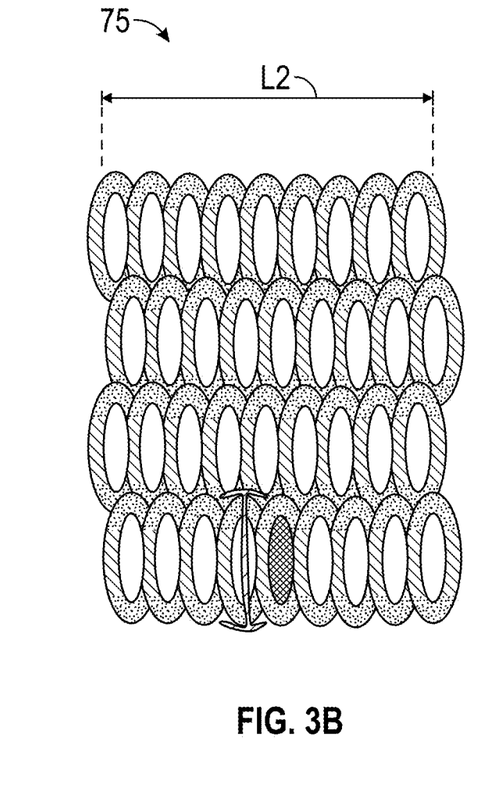
FIG. 3B shows the lattice of beads in a deformed state.

As shown in FIG. 3A, the lattice 73 of beads 90 may have a first length L1 (or longitudinal span) before being subjected to thermal energy. As shown in FIG. 3B, the lattice 73 may have a second length L2 after being subjected to thermal energy, where the second length L2 is less than the first length L1.

Figure 4A:
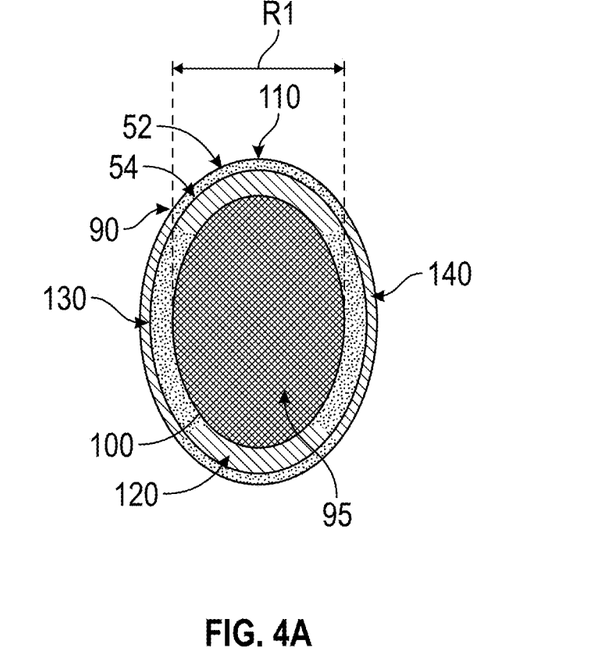
FIG. 4A shows one of the beads formed with damping element.

As shown in FIG. 4A, in addition to having the damping element 95 in the bead void 100, each of the beads 90 may define first and second perimeter segments 110, 120 that are opposite each other and have a first CTE. Third and fourth perimeter segments 130, 140 may be opposite each other and adjacent to the first and second perimeter segments 110, 120. The third and fourth perimeter segments 130, 140 may have a second CTE that differs from the first CTE, to define a bead CTE gradient. In some embodiments, each of the beads 90 may have an outer surface 52 and an inner surface 54. The inner surface 54 defines the bead void 100. The outer surface 52 of the first and second perimeter segments 110, 120 may have the first CTE. The inner surface 54 of the first and second perimeter segments 110, 120 may have the second CTE. The outer surface 52 of the third and fourth perimeter segments 130, 140 may have the second CTE. The inner surface 54 of the third and fourth perimeter segments 130, 140 may have the first CTE. Thus each segment of the beads 90 may form a segment CTE gradient that is the opposite the adjacent CTE gradient and the same as the opposite bead segment.

Figure 4B:
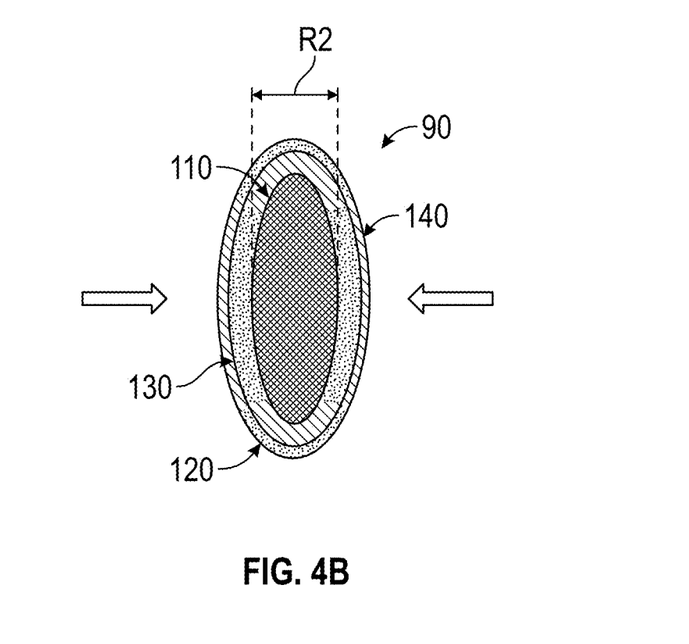
FIG. 4B shows the bead of FIG. 4A in a deformed state.

As shown in FIG. 4B, the bead 90 may deform to a predetermined shape when subject to thermal energy. For example, the bead 90 may deform from an oval with a first radius R1 along its short axis to an oval with a second radius R2 along the short axis that is smaller than the first radius R1. The damping element 95 may prevent unwanted vibrations during deformation and when the material returns to its normal state (FIG. 4A).

Figure 5A:
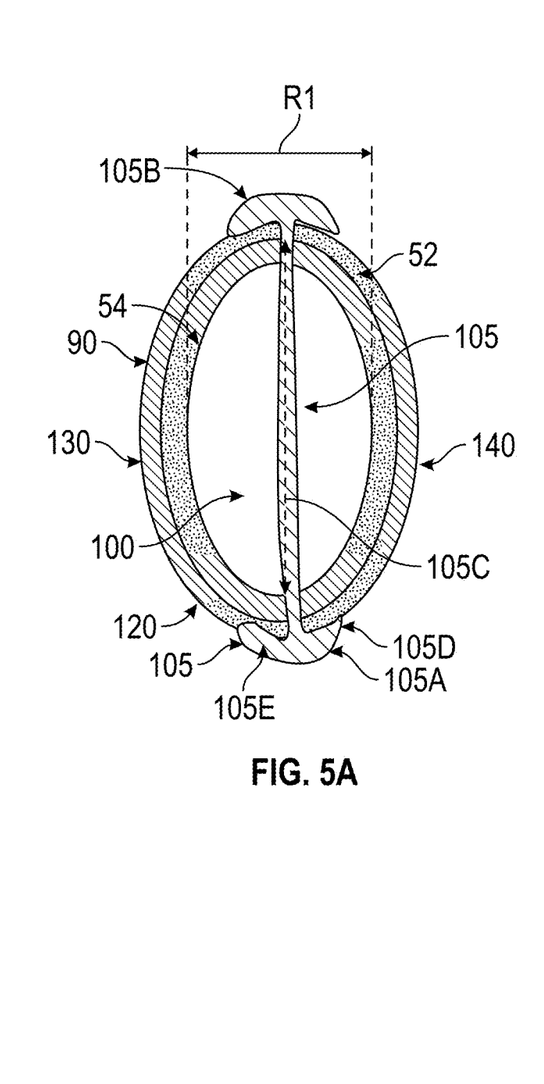
FIG. 5A shows one of the beads formed with stiffening element.

As shown in FIG. 5A, in addition to having the stiffening element 105 extending across the bead 90, over the bead void 100, each of the beads 90 may define first and second perimeter segments 110, 120 that are opposite each other and have a first CTE. Third and fourth perimeter segments 130, 140 may be opposite each other and adjacent to the first and second perimeter segments 110, 120. The third and fourth perimeter segments 130, 140 may have a second CTE that differs from the first CTE, to define a bead CTE gradient. In some embodiments, each of the beads 90 may have an outer surface 52 and an inner surface 54. The inner surface 54 defines the bead void 100. The outer surface 52 of the first and second perimeter segments 110, 120 may have the first CTE. The inner surface 54 of the first and second perimeter segments 110, 120 may have the second CTE. The outer surface 52 of the third and fourth perimeter segments 130, 140 may have the second CTE. The inner surface 54 of the third and fourth perimeter segments 130, 140 may have the first CTE. Thus each segment of the beads 90 may form a segment CTE gradient that is the opposite the adjacent CTE gradient and the same as the opposite bead segment.

As indicated, the stiffening element 105 may extend to the outer surface 52 of the first and second segments 110, 120.

The stiffening element 105 at each end 105A, 105B may extend circumferentially over a portion of the outer surface 52, in either direction away from an axis 105C extending through the stiffening element 105. Thus each end 105A, 105B has securing tabs 105D, 105E formed by the stiffening element 105 to secure it to the bead 90. However, this is not intended on limiting the configuration of the stiffening element 105.

Figure 5B:
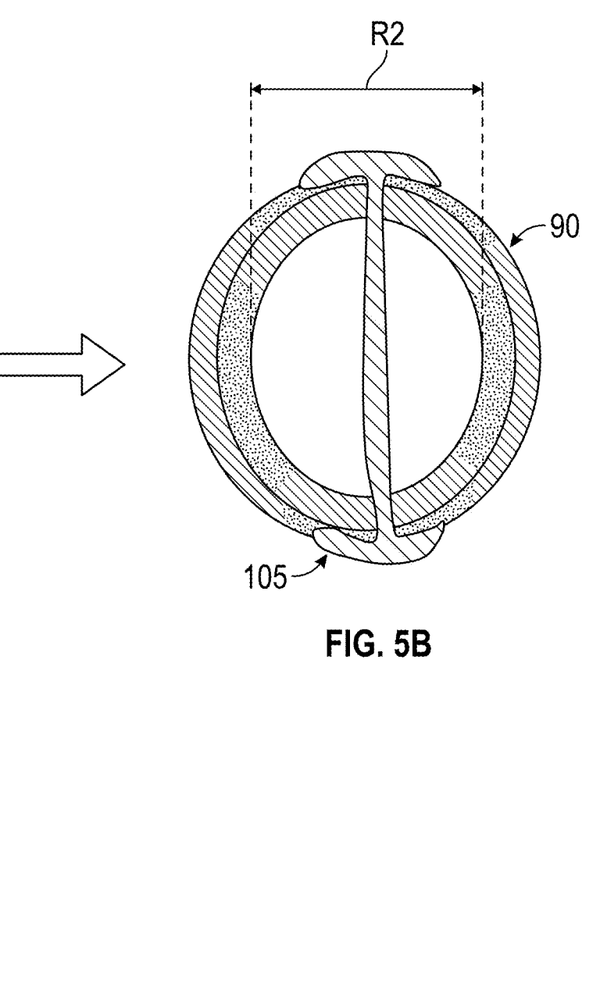
FIG. 5B shows the bead of FIG. 5A in a deformed state.

As shown in FIG. 5B, the bead 90 may deform to a predetermined shape when subject to thermal energy. For example, the bead 90 may deform from an oval with a first radius R1 along its short axis to an oval with a second radius R2 along the short axis that is smaller than the first radius R1. The stiffening element 105, as with the damping element 95, may prevent unwanted vibrations during deformation and when the material returns to its normal state (FIG. 5A).

Turning back to FIG. 2, a thermoelectric junction 150 may be disposed around the outer boundary 80, as illustrated around the second end 320 and portions of the first and second sides 330, 340, as non-limiting embodiments, or in one or more of the bead voids 100. This may enable selectively adding thermal energy to the lattice 73 to obtain the predetermined deformation, such as the actuation of the actuator 10.

The thermoelectric junction 150 may form a Peltier or a Thomson device. For example, alternating P and N-type pillars made with materials with different Seebeck coefficients, or legs, are placed thermally in parallel to each other and electrically in series and joined with a thermally conducting plate on each side, e.g., ceramic, including a cooling plate 160 and a heating plate 170. When a voltage is applied to the free ends of the two semiconductors, via connections 190 there is a flow of DC current across the junction of the semiconductors, causing a temperature difference. The side with the cooling plate 160 absorbs heat which is then transported by the semiconductor to the other side of the device. One of the cooling plate 160 or heating plate 170 may be exposed to the atmosphere if desired to bleed energy from it rather than directing energy from it back to the component 10.

It is within the scope of the embodiments for one or more of beads 90 to includes combinations of the thermoelectric junction 150 within the bead void 100 or around the outer boundary 80, the damping element 95 within the bead void 100, the stiffening element 105 extending across the bead 90.

Figure 6:
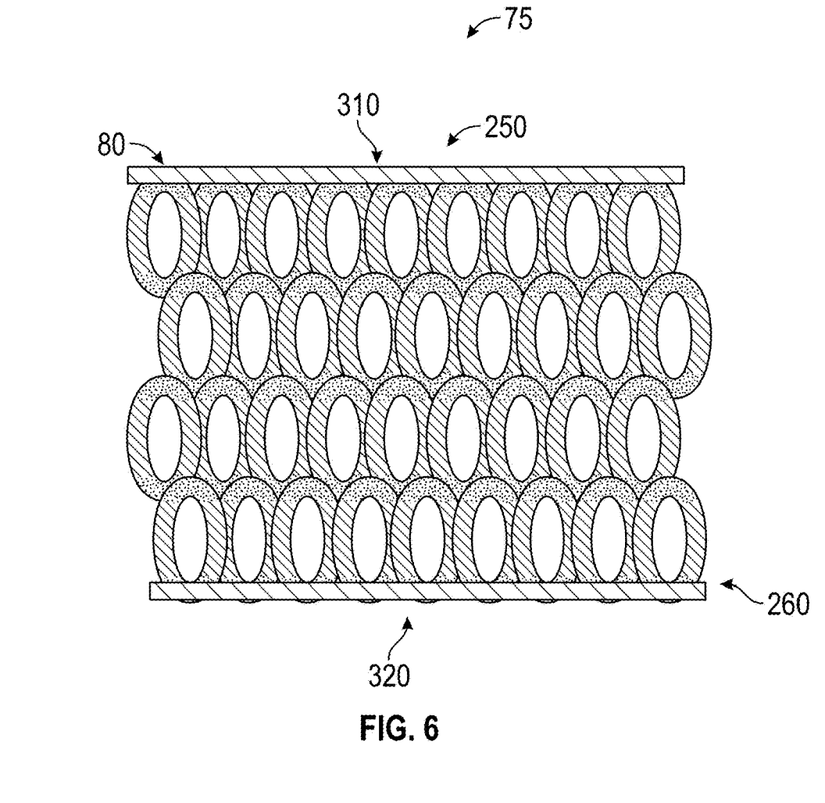
FIG. 6 shows the lattice of beads with top and bottom elastomer layers.

Turning to FIG. 6, the first and second ends 310, 320, along the outer boundary 80 of the base 75 may include a top elastomer layer 250 and a bottom elastomer layer 260. These layers may be utilized for enclosing the beads 90.

Figure 7:
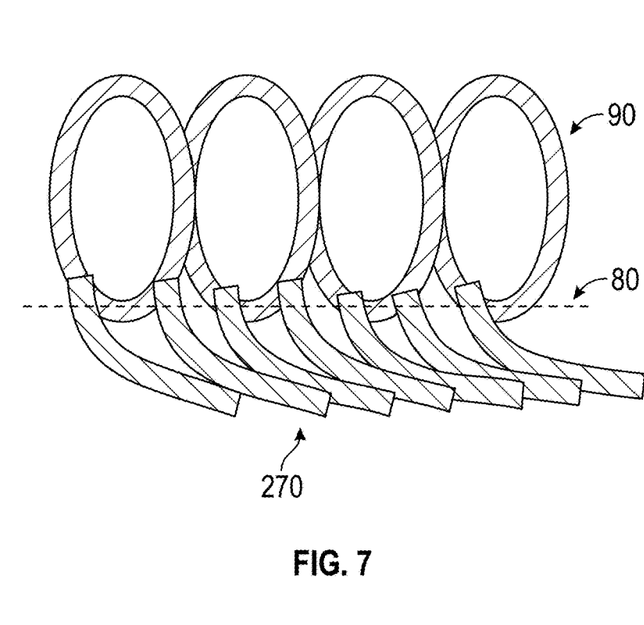
FIG. 7 shows a plurality of the beads from the lattice, with an elastomer segment extending from each bead, over an adjacent bead, to form a continuous elastomer boundary.

Turning to FIG. 7, the base 75 may include an elastomer segment 270 that extends from each of the beads 90 that are located along the outer boundary 80. As a result, adjacent ones of the elastomer segments 270 may overlap each other to define a flexible outer boundary cover.

Figure 8A:
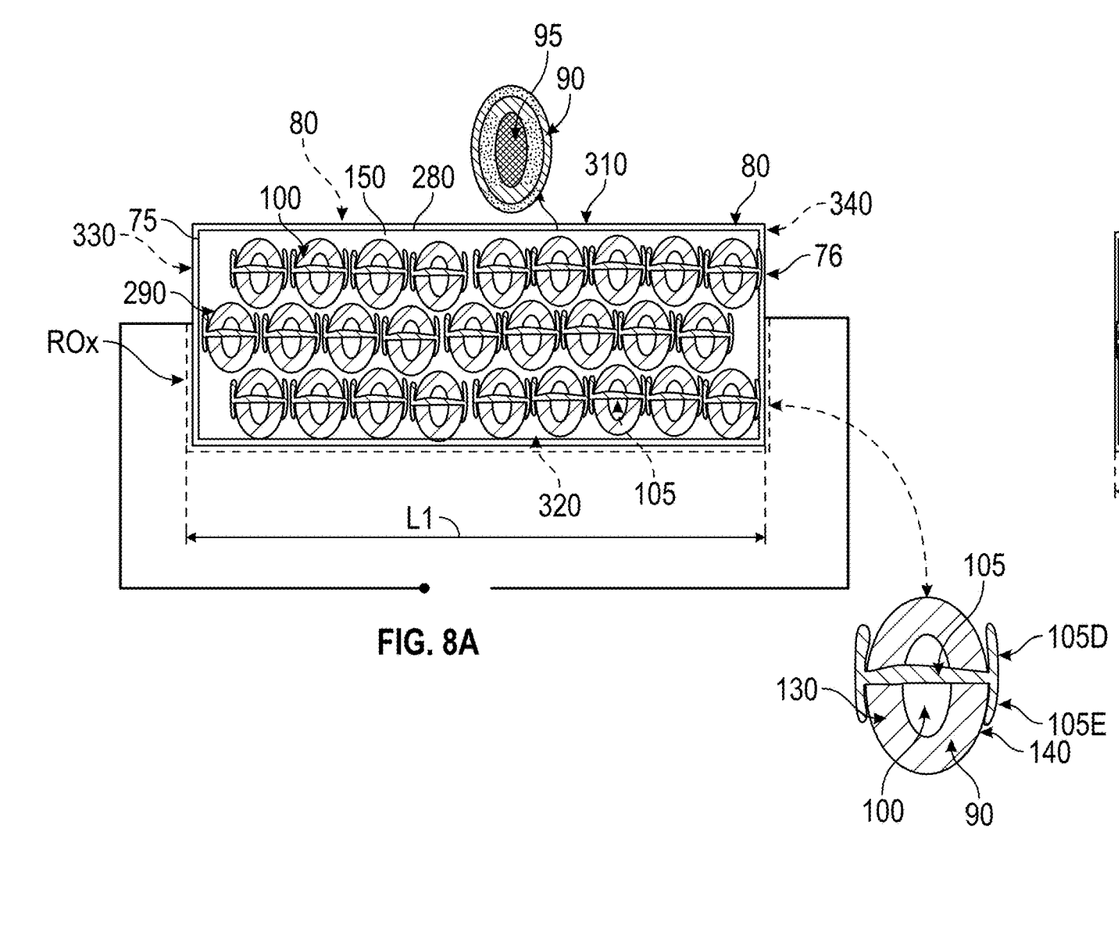
FIG. 8A shows an alternate configuration of the material configuration of the component, having a block shaped base that defines voids, where ones of the voids are lined with one of the beads, and one or more of: damping element formed in one or more of the beads; stiffing material formed across one or more of the beads; and a thermoelectric junction formed either within at least one of the beads or around the base.

Turning to FIG. 8A, the base 75 may be formed as a block 76 having an outer surface 77 defining the outer boundary 80 having the geometry identified in FIG. 2, including the first and second ends 310, 320 and the first and second sides 330, 340. The block 76 may define base voids 290, distributed in rows ROx, with three rows shown. Adjacent rows ROx are offset from each other, though they may be aligned in an alternative embodiment to form columns of beads 90 (FIG. 2). Each of the base voids 290 may be lined with one of the beads 90. The block 76 may be metal, such as a bistable metal, or nonmetal, such as a thermoplastic.

The thermoelectric junction 150 may be disposed around the outer boundary 80 of the block 75, as illustrated around the second end 320 and portions of the first and second sides 330, 340, as non-limiting embodiments, or in one or more of the bead voids 100. The stiffening element 105 may extend across bead 90 from the outer surface 52 between the third and fourth segments 130, 140 to form the securing tabs 105D, 105E along these segments 130, 140.

Figure 8B:
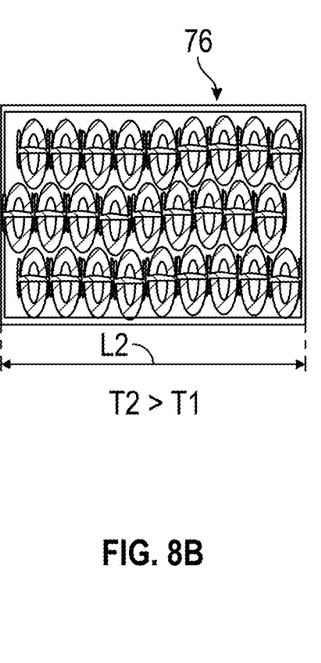
FIG. 8B shows the block of FIG. 8A in a deformed state.

As shown in FIG. 8A, a block 75 containing the beads 90 may have a first length L1 (or longitudinal span) before being subjected to thermal energy. As shown in FIG. 8B, the block 75 may have a second length L2 after being subjected to thermal energy, where the second length L2 is less than the first length L1.

Figures 9A, 10A, 11A:
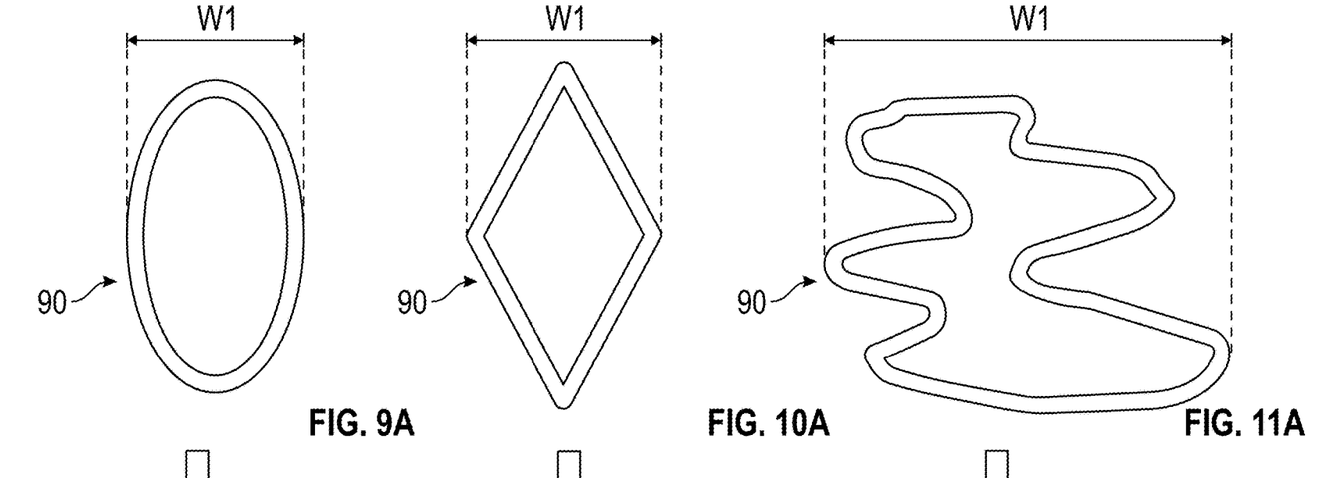
FIG. 9A shows an oval shaped bead that may be utilized in the disclosed embodiments.
FIG. 10A shows a diamond shaped bead that may be utilized in the disclosed embodiments.
FIG. 11A shows a random shaped bead that may be utilized in the disclosed embodiments.
Figures 9B, 10B, 11B:
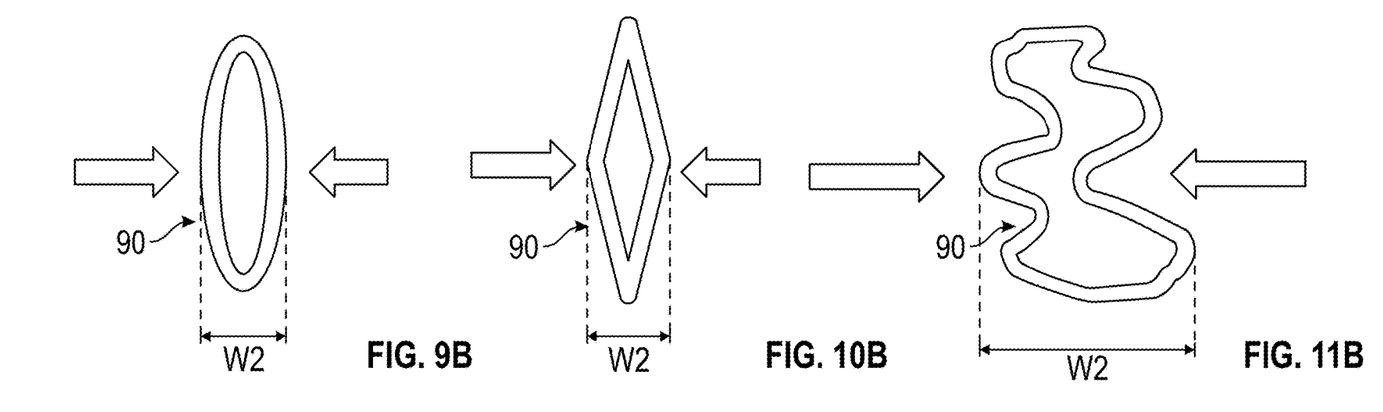
FIG. 9B shows the bead of FIG. 9A in a deformed state.
FIG. 10B shows the bead of FIG. 10A in a deformed state.
FIG. 11B shows the bead of FIG. 11A in a deformed state.

FIG. 9A shows an oval shaped bead 90, which may be formed as indicated above, in a normal state having a first width W1. FIG. 9B shows the oval bead 90 in a deformed state having a second width W2 that is less than the first width W1. As indicated, the beads 90 do not need to be arcuate in shape. FIG. 10A shows a diamond shaped bead 90 in a normal state having a first width W1. FIG. 10B shows the diamond shaped bead 90 in a deformed state having a second width W2 that is less than the first width W1. FIG. 11A shows a random shaped bead 90 in a normal state having a first width W1. FIG. 11B shows the random shaped bead 90 in a deformed state having a second width W2 that is less than the first width W1. The desired deformation shape may determine the shape of the bead 90.

Figure 12A:
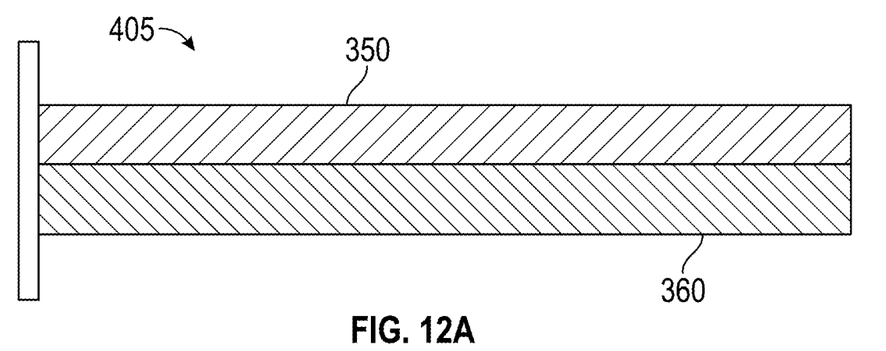
FIG. 12A shows an equivalent structure the structures shown above and for example in FIGS. 2-4.
Figure 12B:
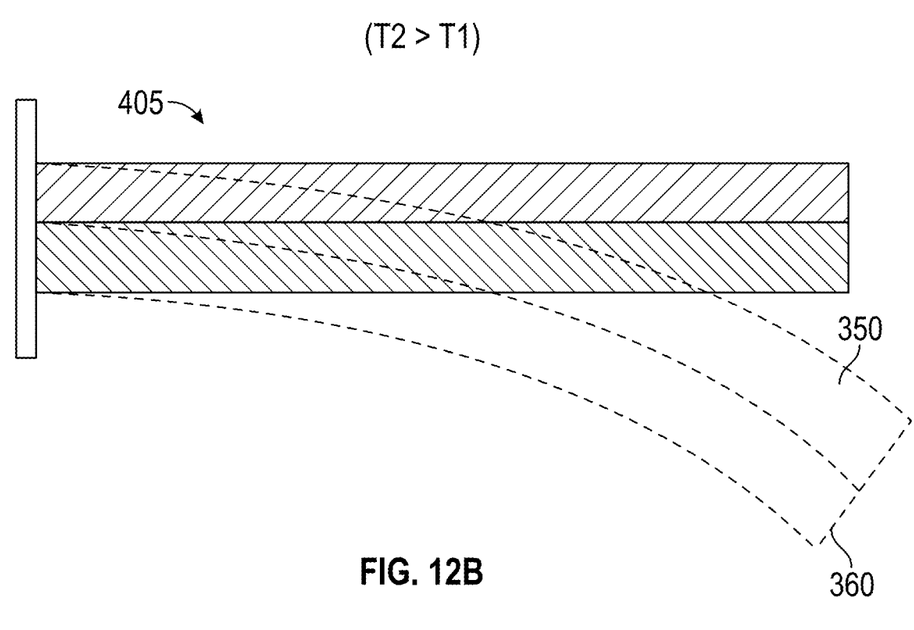
FIG. 12B shows the structure of FIG. 12A at a temperature T2>T1 and in a deformed state.

FIGS. 12A and 12B show a linear equivalent structure 405 to the beads 90. Specifically, the first and second segment 350, 360 are at a temperature T1 in FIG. 12A, and T2 that is greater than T1 in FIG. 12B, i.e., they have received thermal input. The controlled thermal expansion shown in FIG. 12B results from the segments being integrally connected. That is, the first and second segments 350, 360 bend together in a predictable and controlled way. That is, the controlled thermal expansion of the first and second segments 350, 360 in the disclose embodiments provides for controlled manipulation of the component disclosed herein.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An airfoil, comprising:
a body defining a leading edge and a trailing edge, wherein the body comprises:
a base having an outer boundary extending longitudinally from a first end to a second end and transversely from a first side to a second side; and
beads within the outer boundary,
wherein each of the beads has a bead void, and
the damping element within the bead void; and
the stiffening element extending across the bead.

2. The airfoil of claim 1, wherein the one or more of the beads includes the damping element within the bead void, and wherein the damping element is a thermoplastic.

3. The airfoil of claim 1, wherein each of the beads is nonmetal.

4. The airfoil of claim 1, wherein each of the beads is oval shaped or diamond shaped.

5. An airfoil, comprising:
a body defining a leading edge and a trailing edge,
wherein the body comprises:
a base having an outer boundary extending longitudinally from a first end to a second end and transversely from a first side to a second side; and
beads within the outer boundary,
wherein each of the beads has a bead void, and
wherein one or more of the beads includes:
a damping element within the bead void; and
a stiffening element extending across the bead,
wherein:
the stiffening element is a reinforcement fiber.

6. The airfoil of claim 5, wherein the stiffening element is one of: a metal fiber; a carbon fiber; and a fiberglass fiber.

7. The airfoil of claim 5, wherein each of the beads is oval shaped or diamond shaped.

8. The airfoil of claim 5, wherein the one or more of the beads includes the damping element within the bead void, and wherein the damping element is a thermoplastic.

9. The airfoil of claim 5, wherein each of the beads is nonmetal.

10. An airfoil, comprising:
a body defining a leading edge and a trailing edge, wherein the body comprises:
a base having an outer boundary extending longitudinally from a first end to a second end and transversely from a first side to a second side; and
beads within the outer boundary,
wherein each of the beads has a bead void, and
wherein one or more of the beads includes:
damping element within the bead void; or
a stiffening element extending across the bead, wherein:
each of the beads defines:
first and second perimeter segments that are opposite each other and have a first CTE; and
third and fourth perimeter segments that are opposite each other and adjacent to the first and second perimeter segments and have a second CTE that differs from the first CTE, to define a bead CTE gradient.

11. The airfoil of claim 10, wherein:
a thermoelectric junction is disposed around the outer boundary or in one or more of the bead voids.

12. The airfoil of claim 11, wherein:
one or more of the beads includes two or more of:
the thermoelectric junction;
the damping element within the bead void; or
the stiffening element extending across the bead.

13. The airfoil of claim 11, wherein:
one or more of the beads includes each of:
the thermoelectric junction;
the damping element within the bead void; and
the stiffening element extending across the bead.

14. The airfoil of claim 11, wherein:
each of the beads defines:
an outer surface; and
an inner surface, wherein the inner surface defines the bead void,
wherein:
the outer surface of the first and second perimeter segments has the first CTE, and the inner surface of the first and second perimeter segments has the second CTE; and
the outer surface of the third and fourth perimeter segments has the second CTE, and the inner surface of the third and fourth perimeter segments has the first CTE.

15. The airfoil of claim 14, wherein:
the outer boundary defines a first outer end and a second outer end, wherein the first and second outer ends are opposite each other, and
the base includes a top elastomer layer that is disposed against the first outer end of the outer boundary and a bottom elastomer layer that is disposed against the second outer end of the outer boundary.

16. The airfoil of claim 14, wherein:
the base includes an elastomer segment that extends from each of the beads that are located along the outer boundary of the base, so that adjacent ones of the elastomer segments overlap each other to define a flexible outer boundary cover.

17. The airfoil of claim 14, wherein:
the base is formed as a block having base voids, wherein each of the base voids is lined with one of the beads.

18. The airfoil of claim 17, wherein the block is nonmetal.

19. The airfoil of claim 10, wherein each of the beads is oval shaped or diamond shaped.

20. The airfoil of claim 10, wherein the one or more of the beads includes the damping element within the bead void, and wherein the damping element is a thermoplastic.

* * * * *